United States Patent [19]

Hellwarth et al.

[11] Patent Number: 4,935,956

[45] Date of Patent: Jun. 19, 1990

[54] AUTOMATED PUBLIC PHONE CONTROL FOR CHARGE AND COLLECT BILLING

[75] Inventors: George A. Hellwarth, Dallas, Tex.; James B. Hellwarth; David C. Hellwarth, both of Sausalito, Calif.; Jan G. Hellwarth, Dallas, Tex.

[73] Assignee: Telequip Ventures, Inc., Dallas, Tex.

[21] Appl. No.: 342,594

[22] Filed: Apr. 20, 1989

Related U.S. Application Data

[63] Continuation of Ser. No. 189,291, May 2, 1988, abandoned.

[51] Int. Cl.$^5$ .................. H04M 3/42; H04M 3/17
[52] U.S. Cl. ............................. 379/112; 379/199; 379/201; 379/114; 379/145; 379/144; 379/155
[58] Field of Search ............... 379/112, 199, 201, 114, 379/145, 144, 155

[56] References Cited

U.S. PATENT DOCUMENTS

| | | | |
|---|---|---|---|
| 4,027,109 | 5/1977 | Smith et al. | 179/18 BE |
| 4,054,756 | 10/1977 | Comella et al. | 379/114 |
| 4,371,752 | 2/1983 | Matthews et al. | 179/7.1 TP |
| 4,477,698 | 10/1984 | Szlam et al. | 179/90 |
| 4,540,855 | 9/1985 | Szlam et al. | |
| 4,626,630 | 2/1986 | Waldman . | |
| 4,644,109 | 2/1986 | Takeda et al. | 379/143 |
| 4,696,028 | 9/1987 | Morganstein et al. . | |
| 4,698,840 | 10/1987 | Dively et al. | 379/112 |
| 4,712,230 | 12/1987 | Rice et al. | 379/112 |
| 4,723,273 | 2/1988 | Diesel et al. | 379/211 |
| 4,727,577 | 2/1988 | Frey et al. | 379/112 |

OTHER PUBLICATIONS

"May I Help You!" AOS Viability to be Fueled by Non-Traditional Services, by John R. Gammino, Pay-Phone Magazine, pp. 55-58, Dec. 1987.

"OSGR Modifications to Support Alternate Billing Services (ABS), Automated ABS, and Bellcore Automatic Message Accounting Format", Technical Advisory TA-TSY-00453, Issue 1, Sep. 1987, Bell Communications Research, Morristown, NJ.

"Operator Services with Value Added" by Kenneth Casner, Telephone Engineer & Management Magazine, pp. 62-63, Apr. 1, 1988.

"Automating Operator Services", by Albert J. Angel, PayPhone Magazine, pp. 68-70, Apr. 1988.

*Primary Examiner*—Stafford D. Schreyer
*Attorney, Agent, or Firm*—Curtis, Morris & Safford

[57] ABSTRACT

The charge and collect-call functions of a public telephone are arranged automatically by a microcomputer system preferably connected on customer premises between the phone terminal instrument and the local loop, wherein control of said instrument, network signaling and call placement voice prompting of the call parties, recognition of responses from the parties and the network, call detail records of numbers and timings, and data communications with other computers are accomplished by the microcompter system without requiring human operator assistance or the transmission of calls over excessive distances to reach such an operator.

39 Claims, 5 Drawing Sheets

AUTOMATED PUBLIC PHONE CONTROL FOR CHARGE AND COLLECT BILLING

This application is a continuation of application Ser. No. 07/189,291, filed May 2, 1988 abandoned.

FIELD OF THE INVENTION

This invention relates to the switching, accessing, routing, timing, accounting, billing, and generally the control of public telephones and lines and the processing of voice telephone calls, where charges are billed either to credit-account numbers, the called party, or a third party, rather than collected by coin from the caller at the time and point of placing the call. Further, this invention relates to the arrangement of charge or credict billing by automatic means, without the assistance of a human operator, and without routing the call an excessive distance in order to access an operator. Even further, this invention relates to means accomplishing its objects and purposes through a preferred embodiment comprising microcomputer-based electrical equipment located on the customer premises.

DESCRIPTION OF THE PRIOR ART

The prior art is comprised of means such as telephone terminal instruments accessible to the public and used generally for the placing of voice telephone calls, by which means a caller manually keys or dials appropriate information over transmission means, such as local wire loops connecting to a computing and switching means called a "central office switch," which first means collects the dialed caller information, processes the call, and controls the switching, accessing, and routing of caller information over long-distance transmission means to other similarly-arranged computing and switching means that are remotely located, and where voice telephone calls are further connected to a human operator to provide assistance in accounting and billing for a call, and where access over additional long-distance transmission means is provided to a last computing and switching means connected to the local loop of a destination telephone terminal instrument, and also where the various said computing and switching means in combination record the call numbers and timing and further arrange the accounting and billing for the public telephones and calls.

The prior art is further comprised of public telephone instruments, means known variously as "private payphones," "smart payphones," "charge-a-call phones," or by other names, that include microcomputing means for initial processing and interpreting of the caller's dialing information, for providing stored voice prompts to the caller to assist in obtaining correct dialing information, and to provided billing rates for coin-operated public phones, all without the assistance of a central office switch. Said prior art further provides automatic dialing signals different from those provided by the caller and obtained instead from memory means provided within the telephone instrument, to accomplish the accessing, routing, and switching of the call over one or more alternative carriers and the connection of the caller over excessive distances not related to the call destination in order to access one or more alternative operator services that assist in timing, accounting, and billing for charge and collect calls.

Even further, the prior art is comprised of microcomputer means, known variously as "dialers," "autodialers," "smart dialers," "store-and-formed dialers," "network access computers," "call processors," or by other names, that are connected between a public telephone instrument and a single local loop, provided either within or separate from the enclosure of the telephone, but not within any private branch exchange switch or other equipment that is located on the customer premises, wherein said microcomputer means accomplishes any of the foregoing functions, including the initial processing and interpreting of the caller's dialing information, the providing of tones to prompt the caller for correct dialing, the automatic dialing of signals different from those provided by the caller and obtained instead from memory means provided within the microcomputer means to accomplish the accessing, routing, and switching of the call over alternative and the connecting of the caller over excessive distances not related to the call destination in order to access alternative human operator services that assist in timing, accounting, and billing for charge and collect calls.

Finally, the prior art is comprised of microcomputer means that are connected to two or more separate local loops used for creating a three-party connection between the originating caller, the operator assistance service, and the destination party, wherein call detail records are created in the memory means associated with said microcomputer means and are stored for later transmission over one of the local loops to a separate or remote computing means, further enabling subsequent presentation of the billed charges to the customer for payment.

SUMMARY OF INVENTION

Accordingly, several objects and advantages of the invention include providing public phone service that permits and arranges long-distance calls, the charges for which can be billed either to a credit account, to the called party, or to a third party, rather than from coins deposited in said telephone instrument, whereby the revenues collected from the telephone service can be realized by a private person or firm not organized for business as a public utility.

Further, the objects and advantages of the invention include providing any one of several common, familiar, public-phone terminal instruments that have a familiar payphone appearance, whether a wall-mounted heavy-duty instrument, a coin-operated instrument, a wall or desk light-duty instrument, or a radio-operated cordless instrument, one or more of which would be suitable for providing telephone service in the rooms, hallways, and lobbies of hotels, motels, and airports, on street corners and outdoor walkways by stores, in penal institutions, prisons and jails, in university dormitories and buildings, and additionally in restaurants, truck stops, and bars including at the caller's table or seat.

Even further, the objects and advantages of the invention include the providing of a long-distance public telephone calling service in which the majority of the calls do not require the assistance and cost of a human operator and are accomplished by automation means including microcomputers and other electrical apparatus. The long-distance calls and signals are economically routed, switched, and transmitted directly from the point of origination to the point of destination by the least expensive methods available from selected carriers, and without, transmitting calls over excessive distances, The long-distance telephone service is provided in a more economical and low-cost manner benefiting both the caller and the private party providing the improved service.

Further yet, the objects and advantages of the invention includes to provide automated, recorded voice prompts to both the calling and called parties while arranging the billing details, with one of several languages being selectable by the caller. It also is an object to provide automatic recording, analysis, and playback of selected voice signals being transmitted over the telephone line. More particularly, the signals recorded and played back include the caller's name for use in arranging collect and third party billing. It is a further object to provide detection and recognition means to responsive signals returned for acceptance of collect charges, incluiding tone and dial pulse signals, and further to provide an analysis of loop current, line voltage, ringing, dial pulse, ringback, busy, intercept, disconnect, and other supervisory signals that exist at the terminal end of the local loop, and to provide detection and recognition means for line unbalance , noise, crosstalk, and other fault and malfunction conditions, while ensuring accurate identification of the beginning and ending times of billable calls.

And even further, the objects and advantages of the invention include to provide means for recording the details of all calling activity in memory means connected to the microcomputer means, to maintain certain information in the memory for instant screening and evaluation of the acceptability of the specific number being called and for denying access to restricted types or classes of calls to be selected for each specific installation, to maintain certain calling and charge number information in said memory for instant screening and evaluation of the validity of charge numbers at the moment during and shortly after when the numbers are being entered by the caller, to provide means for placing a validation call either to the public access port of the network system or to any other communicating computer and database means established particularly for validation purposes, to present the caller's credit and/or charge numbers for lookup in a validation database, to detect and analyze the responsive signals that return the information describing the validity of the credit number, including analyzing and recognizing responsive voice signals, to permit or deny further processing of the caller's charge call depending on the validation information acquired, to offer by speech promts to the caller an alternative billing method in the event that credict validation is unavailable, and to arrange transmission of call details and timings over the local loop, at a time when no call demand or activivly exists, to a separate or remote computing means that enables subsequent presentation of the billed charges to the customer for payment.

And still even further, the objects and advantages of the invention include to provide means for conducting the same DC loop current and talk battery voltage, and for delivering the same power to the telephone instrument as provided by the central office, to maintain the power even while the voice and dialing signals are interrupted from passing between the source and destination and are separately controlled by the means of the invention, to provide switching means to connect to an existing central office line and private phone installation and to share said line without mutual interference or cross connection with a newly-installed public phone utilizing the invention, on which installation light usage is anticipated, to provede further switching means to connect more than one such newly-installed light-usage phone instrument to a single embodiment of the invention and to connect such additional phone instrument over the same local loop to the central office as being utilized by both the previously-existing private phone installation and the said newly-installed first public phone.

And yet still further, the objects and advantages of the invention include to provide means wherein local calls are permitted either to be placed without charge, to be paid by coin, or to be billed the same as a long-distance call, wherein the call detail record created and retained in the memory means of the microcomputer means can be used as the basis for imposing both a base charge proportioned upon the duration of the call and also a surcharge imposed dependent upon the class of call or billing method selected by the caller, wherein the charges imposed for the call meet regulatory restrictions that may exist in the locality of the installation, wherein destination numbers that are located within the local access transport area of the originating phone can be distinguished and routed in compliance with state regulatory restrictions, and wherein the call detail record can be communicated, immediately following each call and without utilizing the central office line, to a computing and printing means located on the same premises as the invention to report to a local credit account a basis for charges to be added immediately to said account or to be collected from the caller either at the time of use shortly thereafter.

And yet still further, the objects and advantages of the invention include to provide means for data and system integrity and security wherein the several data communications functions between an automation microcomputer and a remote host computer, such as the transfer of call detail records and program updates, is carried out without the likelinhood of interference by "hackers" or disgruntled personnel desiring to obtain unauthorized telephone service, to create or impair call detail records, or otherwise to alter the operation of the microcomputer.

And yet still even further, the objects and advantages of the invention includes to provide means wherein the memory means of the microcomputer means will retain all its information in the event of a loss of AC mains power, wherein the microcomputer means will automatically restart and operate properly following a loss of AC mains power or following a transient error in the program data, wherein the electronic hardware means and the operating program means contained in the memory means of the micromputer means can be analyzed and diagnosed, either by placing and/or receiving a data communications call over the same local loop as utilized by the caller or by local data connection to another diagnqstic and maintenance computer means, wherein program fixes, changes, and other updates can be automatically loaded and installed without the personal presence and supervision of a service person.

And finally, the objects and advantages of the invention include to provide means wherein as many of the foregoing objects and advantages as would be relevant can be realized and implemented in an alternative embodiment that is physically contained within or attached directly to a private branch exchange switch located on the customer premises, wherein said relevant objects and advantages can be realized and implemented in yet another alternative embodiment that is physically contained within or attached directly to a central office switch, a tandem switch, a local exchange switch, or any other such switching means physically located elsewhere from the telephone terminal instrument accessed by the caller and elsewhere from the customer premises.

DETAILED DESCRIPTION OF PREFERRED EMBODIMENT

Figure 1:
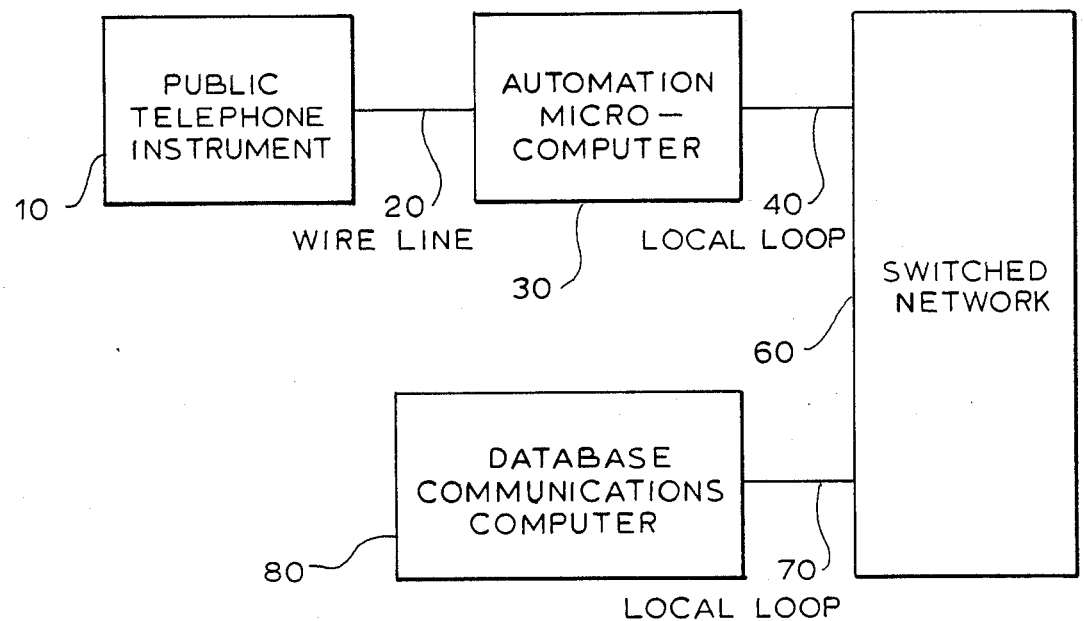
FIG. 1 shows a block diagram for implementing a dedicated automation microcomputer by connection to a public telephone and the existing switched network.
Figure 2:
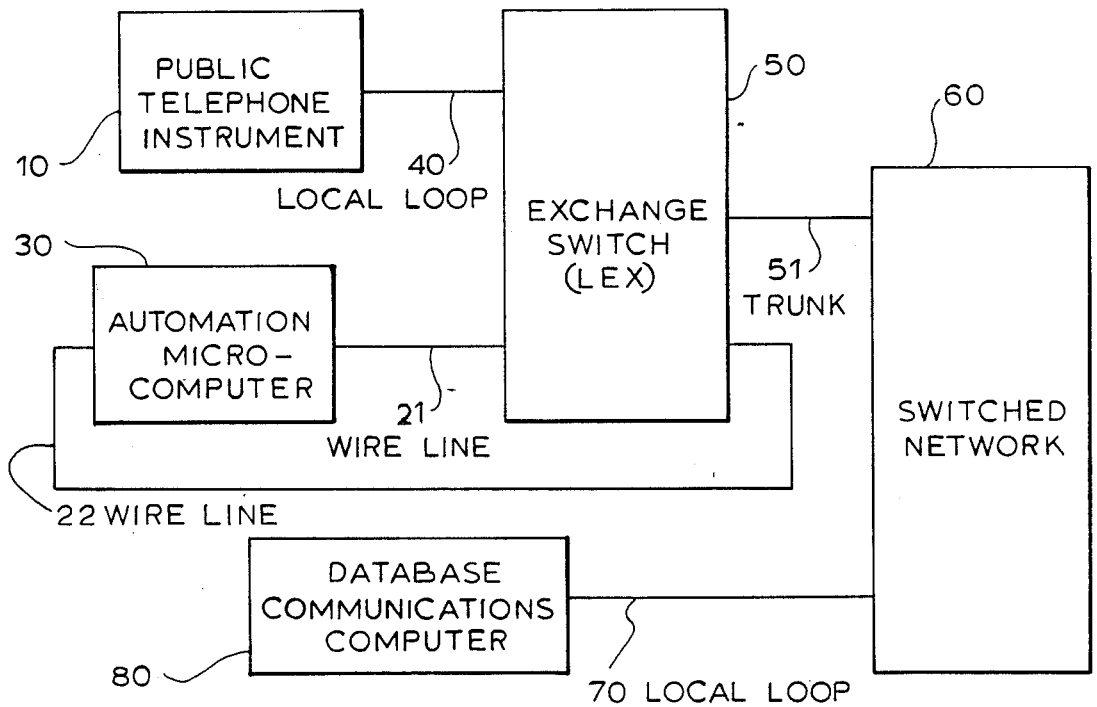
FIG. 2 shows a block diagram for implementing a shared automation microcomputer by connection to a local exchange switch.
Figure 3:
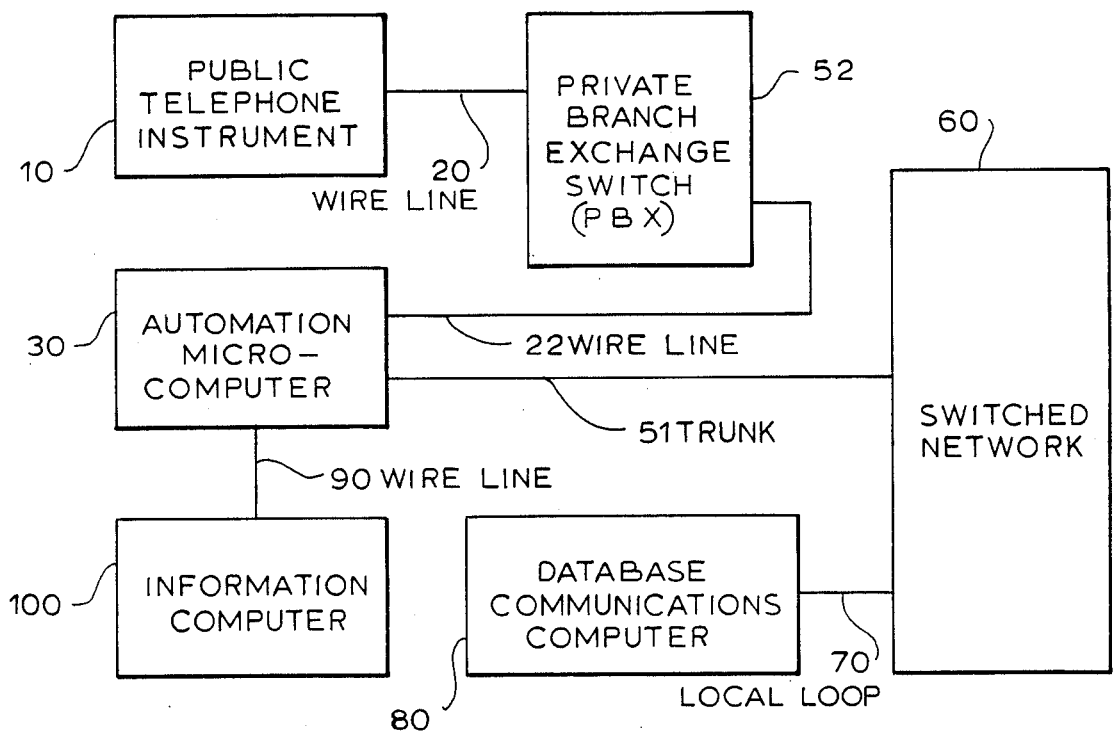
FIG. 3 shows a block diagram for implementing a shared automation microcomputer by connection to a private branch exchange switch.

The present invention of an automation microcomputer that provided call processing and operator services solves several substantial problems associated with the prior art by connecting said computer 30, shown in FIGS. 1, 2, & 3, to be the appropriate wire lines 20, 21, 22, 40, and 51 connecting public telephone instrument 10 to the public switched network 60. The customer-accessible public telephone instrument 10 is a conventional instrument such as a wall-mounted coinless phones, a wall-mounted coin-operated phone, a desk phone, or a cordless phone with radio-operated handset and base unit. Only the standard tip and ring wire lines of telephone instrument 10 are connected to computer 30, no other connections are required to be made. Line-powered telephone instrument 10 will receive substantially the same line voltage and current as supplied by switched network 60, local exchange (LEX) switch 50, or private branch exchange (PBX) switch 52, passed through by computer 30. FIGS. 1 and 3 show the automation microcomputer 30 located on the same customer premises as the telephone instrument 10 and PBX switch 52. FIG. 2 shows computer 30 located away from the customer premises and instead with local exchange switch 50.

The operating program stored in automation computer 30 permits it to arrange conventional data communications over the same local loop 40, wire line 21, or trunk 51 that connects to switched network 60 for handling customer calls. Automation computer 30 can transmit stored dial numbers required to reach communications computer 80 located at any remote site accessible by the public telephone network. Similarly computer 80 can dial and arrange data communications with computer 30, and independent of which computer initiates a communication session, programs and data can be transmitted in a conventional manner. Each session begins with a security protocol requiring passwords to be sent and checked by the receiving computer to prevent unauthorized communications and undesired altering of any program or data files. All data communications are sent with conventional error checking and correction procedures to ensure correct data begin received.

Referring now to FIG. 3, automation microcomputer 30 is also equipped with a serial communication port that permits local communications over wire line 90 to and information computer 100 located on the same premises as computer 30. This communications path permits access of an on-site database within computer 100 that can be used for verification of credit accounts, in addition to sending call data and reports to a printer included with computer 100 for site management to use as each call is completed. Program modifications or service for automation computer 30 are accomplished by data communications either with on-site information computer 100, with a substitute for computer 100 connected to the same port by a service technician, or with remote data base communications computer 80. Since data communications to a second computer is always available to automation computer 30, no programming or data inquiry is enabled or permitted using the customer-accessable telephone instrument 10.

In the event that more than one automation computer 30 is connected to more than one of the trunk lines 51 leading to PBX switch 52 as shown in FIG. 3, or in the event that more than one automation computer 30 is connected to more than one of the lines 21 & 22 associated with LEX switch 50 in FIG. 2, it is within the intents and scope of this invention to describe a multi-line embodiment wherein various resources of an automation computer 30 are shared among many lines providing many lines of automated operator services, simultaneously handling more than one customer call and conversation.

CUSTOMER OPERATION

The operation of the automation microcomputer 30 is substantially the same in each of the embodiments of FIGS. 1, 2, and 3. After installation and programming, the operation viewed by a customer accessing public telephone instrument 10 proceeds as follows.

Telephone 10 is taken off-hook by a customer of public telephone 10, the off-hook condition is passed to LEX switch 50 and/or swtiched network 60, and conventional dial tone is generated by computer 30 and heard by the customer in the earpiece of telephone 10, indicating that the line is available to receive a dialing sequence. In the preferred embodiment, subject to installation options, all calls will be treated as charge calls, such that whether the customer dials a preceding digit "1+" or "0+," or just dials a destination number with NO preceding digit, only the computer 30 receives and detects the dialed digits.

When computer 30 obtains a complete valid number from the customer's conventional dialing, it is screened against a stored table of permitted and prohibited destination numbers. Certain numbers like the entertainment numbers with a "900" area code or a "976" exchange code may be prohibited by an installation option, including when "976" exchange calls ar dialed as long-distance calls. If the screened destination number is permitted, a conventional "bong" tone is generated by computer 30, regardless of the dialed "1+" or "0+" prefixes, and heard by the customer within two or three seconds of the last dialed digit.

SELECTION OF CALL OPTIONS

As is conventional, the customer is expected to dial either a "0" digit after the "bong" to arrange collect billing, or a 12- to 16-digit number for billing the call charges to a credit account. The unique solution to a long-standing industry problem that is solved by the invention particularly involves automating collect calls signaled by the "0" digit following the "bong" tone. Immediately after computer 30 detects the dialed "0" digit, a hum voice signal is generated by the computer and heard by the customer in the earpiece of telephone 10: "For collect calls, press ONE (Beep)... For person-to-person collect, press TWO (Beep)... For third-party billing, press THREE (Beep)..."

The "Beep" at each selection point is a brief tone that telephone users are culturally accustomed to hearing before providing a response, such as in voice mail systems and conventional magnetic-tape message recorders. At any time during the message, however, not just during the brief pause following the "Beep," the customer can dial the digit to make his selection, and the computer prompt will immediately be terminated after detecting the dialed digit.

In the event that more than five seconds passes and neither a "0" or the first digit of a credit number has been received by computer 30, the above message sequence explaining the choices is presented to the customer, following the additional voice message: "Please dial your credit number, NOW (Bong)..." If two or more digits are not detected within another three seconds, the previous message is then presented: "For collect calls, press ONE (Beep)... For person-to-person collect, press TWO (Beep)... For third-party billing, press THREE (Beep)..."

In the southern regions of the Unites States the use of Spanish as an alternative language is very common. Another option can be supplied with computer 30 that would permit the customer to select the messages in a second language such as Spanish. After the billing methods are presented as above, computer 30 can be arranged to provide the additional choice as follows: "For a Spanish voice, press SEVEN (Beep)..." This message itself can be given in Spanish language as an additional option, before the selection is made.

In the event that none of the first options is selected by the customer as they are explained by the voice message, computer 30 continues to offer the following options: "For emergency assistance from an operator, press ZERO (Beep):" Remembering that at this point a destination number has already been dialed, it would be rare that the assistance of a live operator would be required. Only in the event that the customer was unable to understand the language of the speech messages that have been provided by computer 30, is it likely that any assistance will be requested. If a live operator has been requested by the customer, computer 30 will radial the call to access either a public operator or a private operator service according to options arranged at time of installation and programming.

37 0—" AND DEFAULT CONDITIONS

It is possible that after the customer takes the phone off-hook, only a single digit "0" for Operator is dialed. If after five seconds pass following such a single "0" digit is received by computer 30, the so-called "0—" condition will have occurred where it is assumed that either an emergency condition has occurred, or the customer is unable to operate the phone and dial a number. The voice message will then be created by computer 30: "Please dial the number you are calling, NOW (Beep)..." If another three seconds passes without any dialing occurring, the message is repeated: "Please dial the number you are calling, NOW (Beep)..." After the second attempt at soliciting a destination number, computer 30 will present the message: "For local information about numbers, dial five-five-five, one-two-one-two. For a Spanish voice, press SEVEN (Beep)... For emergency assistance from an operator, dial ZERO (Beep)..."

Even if the customer takes the phone off-hook, and fails to dial any digit at all for five seconds, it will be assumed that the "0—" condition will have occurred as above. The same message sequence will begin to be presented to the customer, until a recognizable sequence of digits is begun to be dialed. After the entire message sequence is presented, including repeating the first message: "Please dial the number you are calling, NOW (Beep)..." and after no dialing is detected, the customer handset will remain connected to the switched network subject to the default current and voltage conditions determined bvy the conventional network. The handset in general becomes silent and inoperative until such time that it is first placed back on-hook for around one to ten seconds.

STATION COLLECT CALLS

For a station-collect call, after the customer presses digit "1," computer 30 creates a voice that says to the customer: "Please state your name, NOW (Beep)..." The customer then speaks his or her name into the mouthpiece: ".. James Brown ..," computer 30 analyses the start and finish times of the utterance, digitizes the one-to-three second spoken name, then stores it temporarily in memory. "One moment please, while your call is being processed," states computer 30 to the customer through the earpiece of telephone 10, while it speed-dials the destination number onto the switched network as a direct-distance dialed call, and as though it were for a "1"-prefixed station call. In the event that alternative carriers are arranged for handling the call, the programming options in computer 30 dial a sequence of prearranged access digits to route the call by the least expensive means available to the installation.

Within the few seconds of normal delay encountered in switched network 60, the destination number is connected and starts ringing. Computer 30 detects the ringing signal and distinguishes it from busy, intercept, and disconnect signals that could be returned from network 60. When the destination party answers, the ringing signal ceases, and speech-like signals are detected, computer 30 makes the decision that the call has been answered by the destination party. The connection provided for computer 30 to the LEX switch may or may not include definitive supervisory signals, more about which is discussed in this invention description.

A voice signal is now generated by computer 30 and heard by the destination party, with a copy being also heard by the calling party, but the calling and destination parties are prevented by computer 30 from being able to communicate directly with each other at this time. "This is a collect call TO anyone, FROM .. John Brown ... If you will pay, please dial NINE, NOW. (Beep)..." The name of the calling customer is played back from the memory of computer 30 and inserted instantaneously into the frame of the voice prompt. The actual voice characteristics of the customer who gave his name are preserved as an aid for the destination party to recognize the identity of the caller.

When the destination party either presses the "9" button on a tone-type telephone, or dials "9" on a pulse-type rotary dial, computer 30 detects the return signal. The last spoken sequence from the computer-generated voice is heard by both parties, and concludes: "Thank you for using the T-E-L automated operator service. Here is your party." The voice connection between the customer and the destination parties is then completed by computer 30, and at this moment the timer contained within computer 30 starts to measure the billing duration of the collect call.

PERSON-TO-PERSON COLLECT

In the event that the customer dialed a "2" to request a person-to-person collect call, then stated his name, "John Brown," the voice of computer 30 would follow the digit with the statement: "Please state your name, NOW. (Beep) . . ." "John Brown," responds the customer, the same as in station-collect calling. Then computer 30 states: "Please state the name of the person you are calling, NOW. (Beep) . . ." "William Green," responds the customer to computer 30 as it again analyses the start and ending times of the voice utterance and again digitizes the signal for temporary storage in computer memory. "One moment please, while your call is being processed," again states computer 30, the same as for a station-collect call.

After the number of the destination party is speed-dialed over the appropriate network, up to five rings of time is waited, the call is answered, then cmputer 30 now states to the destination party, "This is a collect call TO . . . William Green. . . FROM . . . John Brown. . . If you will pay, please dial NINE, NOW. (Beep) . . ." After detecting the acceptance digit for reversing the charges, the concluding voice sequence heard by both parties is the same: "Thank you for using T-E-L Automated Operator Service." Here is your party."

In the event the the destination party does not immediately signal acceptance of the reversed charges, computer 30 will repeat the solicitation message, including playback of the the recorded name or names. For a person-to-person call, it is expected that a longer time is required on the average to get the named party to the destination telephone, as the party named may not be the party initially answering the call. Computer 30 can be programmed with the option to permit several repetitions of the message, or to reword the message before terminating an attempt at a collect call. After the first repetition of the person-to-person message prompt, computer 30 will reword the solicitation message to the destination party: "If . . . William Green. . . is there to accept a collect call FROM . . . John Brown. . . , please dial NINE, NOW. (Beep) . . ."

After the final attempt at obtaining acceptance of the collect call, computer 30 will terminate the call and prompt the customer: "Your call could not be completed as dialed. Please hang up and dial again." After the final message, computer 30 forces a hang-up condition to occur on the switched network 60, and if the customer still is holding the handset of telephone 10 off-hook, then a new dial tone will be obtained from the network and heard by the customer to signal the availability of the telephone 10 for the start of a new attempt at a new call.

THIRD PARTY BILLING

In the event that the customer chose third-party billing at the start of the call by dialing a "3" selection digit, computer 30 responds with the voice message: "Please dial the area code and phone number for your billng, NOW. (Beep) . . ." After a valid seven-digit local number or a ten-digit number with a valid area code in the first three digits is received by computer 30, the voice message is returned to the customer: "One moment please, while your call is being processed."

Computr 30 then speed-dials the billing number over the appropriate network, waits up to five rings for a party to answer, then presents the following initial message to whomever answers: "This is to verify a third-party billing BY . . . John Brown . . . If you will pay, please dial NINE, NOW. (Beep) . . ." If the acceptance digit is detected by computer 30, a voice message is returned: "Thank you for using T-E-L Automated Operator Service." The verification call to the third-party number is then terminated by computer 30 interrupting the local 40 or trunk 51 which places it on-hook. A one-second delay occurs before once again going off-hook to obtain a new dial tone from LEX switch 50 and/or switched network 60, followed by computer 30 speed-dialing the customer's destination number as a "1+" direct-distance-dialed call.

Computer 30 then provides the message to the customer just before the dialed number starts to ring: "One moment please, while your call is being processed." In the event that the destination party answers within five rings, the parties begin their connection in a conventional manner, and no more messages are provided by computer 30. Incomplete calls if any of the collect or third-party-billed calls are not answered within five rings, or within the time set by some other number of rings established by program option in computer 30 at time of installation, computer 30 will provide the following message while the call continues to ring: "Your party has not answered. Please hang up to make another call. Thank you for using T-E-L Automated Operator Service." When the customer finally does hang up, or when about one minute of unanswered ringing has occurred, computer 30 goes on-hook with LEX 50 and/or switched network 60 whether or not the customer has hung up.

CALLING CARD VERIFICATION

In the event that the customer has chosen to enter a credit account number, computer 30 evaluates the number to determine what type of credit account has been used. If the digits of the number that have been entered are those of a telephone credit account, they will have a valid area code as the first three digits of a 14-digit number. The destination number is then speed-dialed by computer 30 onto the conventional switched network 60 served by one of the public telephone companies. After waiting about five seconds after the last digit of the destination number, the conventional "bong" tone will be detected by computer 30. Immediately after the network-supplied "bong," computer 30 speed dials the 14-digit credit account number into the public access port of the telephone company computer for verification.

Computer 30 receives and detects one of the two responsive voice messages that indicate over the public access port the status of the credit accound number. The acceptance message normally is provided by a recorded female voice within two seconds of the end of the last digit sent for the account number: "Thank you for using A-T and T," or "Thank you for using Southern Bell." The alternative rejection message normally is provided after four seconds following the end of the last digit sent for the account number: "Please dial your credit number again, NOW. The credit number you have dialed is not valid . . . (Bong) . . ." Computer 30 detects and distinguishes both the timing and the voice characteristics of the beginnings of the two messages to verify the account number for billing.

As soon as the detection is confirmed by computer 30 as a valid account number, the verification call is immediately terminated to obtain a new dial tone and a new opportunity to place the same customer call as a "1+" direct-distance-dialed call routed over an appropriate, prearranged carrier and network. In general, when public credit numbers are verified by this unique way using the assistance of the public access port of the public telephone company, intraLATA calls will be placed with the local Bell Operating Company (BOC) and intraLATA long-distance calls will be placed with AT&T as the carrier ("LATA" is the well known acronym for "Local Area and Transport Area—a local telephone area and network controlled by a BOC.)

Computer 30 completes a successful account verification by providing a message to the customer as follows: "Thank you for using T-E-L." Then the network ringing of the speed-dialed second call to the destination number will be passed directly to the customer earpiece by computer 30 while waiting for the destination party to answer. In the event that computer 30 detects a rejection of the account number provided by the customer, the customer will be provided a second chance to enter a valid account number before the call is finally terminated. While the public access port is providing a message received by computer 30, the customer will be simultaneously provided with substantially the same message by computer 30: "Please dial your credit number again, NOW (Beep) . . . The credit number you have dialed is not valid . . . (Bong) . . ."

As soon as computer 30 has started to receive a second account number from the customer, it is started to be repeated simultaneously by computer 30 to the public access port, in order to prevent the port from timing out. As soon as a complete 14-digit account number has again been dialed by the customer, the second attempt at verification from the public access port is made, and the second voice response is evaluated by computer 30.

If the second attempt is valid, computer 30 completes the sequence in the same manner as if the first attempt had been valid. If the second attempt is also not valid, and the public access port will not accept a third accound number, a termination message is provided to the customer: "The credit number you have dialed is not valid. Please hang up to make another call. Thank you for using T-E-L Automated Operator Service." Whether or not the customer hangs up at this point, computer 30 terminates the call by interrupting the local looop, delays one second, and goes off-hook once again to obtain a new dial tone to permit the customer to start another, independent dialing sequence.

BANK CARD VALIDATION

In the event that the customer dials a credit number that is not a telephone account number, as verifiable above through the public access port of the telephone company, computer 30 performs an evaluation of the number to determine if it is either an AT&T corporate account number, or one of several bank credit account numbers. The AT&T corporate account number does not have a valid area code in the first three digits, but is 14-digits in length the same as an individual telephone account number. Bank credit cards have numbers varying in length from 12 to 16 digits, but each has a distinctive number pattern that can be screened by computer 30 prior to attempting to arrange a validation.

In the event that the program options installed in computer 30 permit a call to be billed to a type of card used by the customer, and an expiration date is contained on that type of card, computer 30 will follow the last digit entered with the request: "Please dial the expiration date on your card, NOW (Beep) . . ." If three or four digits are received by computer 30 that represents a current future date, the response is provided: "One moment please, while your call is being processed."

Computer 30 now carries out one of several validation procedures, depending on programming options selected at time of installation. The first option is that a prearranged number is dialed over the switched network to reach some sort of database communications computer, such as computer 80 shown in FIGS. 1, 2, and 3. After data communicatiion have been established, the customer credit account number is transmitted for query into the database, and for determination whether it is an unknown, valid, or invalid number. The database may be a privately-created one accumulating the experiences of communicating with many automation computers 30, or one with numbers provided by the banks and credit agencies issuing the various types of cards and accounts.

Computer 30 follows the validation code provided in response to the database query, which is obtained within a few seconds of establishing data communications. After the validation response is detected, computer 30 provides either the same acceptance message previously used, "Thank you for using T-E-L Automated Operator Service," followed by terminating the data communications, obtaining a new dial tone, speed-dialing the destination number, and presenting the network ringing of the destination line before it is answered. In the alternative to acceptance, the same rejection message previously used, "The credit number you have dialed is not valid. Please hang up to make another call. Thank you for using T-E-L Automated Operator Service."

At an installation where there are many lines and automation computers 30 installed, the local connection to an information computer 100 can be used to queery the database of computer 100 for validation. With this option, customers arriving at a hotel or other facility where such an installation has been made will provide their credit account number to the site management when checking in, and the number will be keyed into the database of the information computer 100 prior to the customer placing any telephone calls. The validation of the number will be handled in the same manner by site management as currently being done for other charges placed on the credit of the customer account. In the event many automation computers 30 are installed for a chain of hotels, accumulated databases can be shared and updated among the various information computers 100 installed at the several facilities.

INTERNATIONAL CALLING

The conventional dialing prefix for direct-dialed international calls is "011," while conventional operator-assisted international calls are prefixed with just "01." Computer 30 handles these calls in exactly the same manner as domestic calls to the U.S. and Canada, numbers identified with three-digit area codes preceding a seven-digit local number. The operational difference is that the total number of digits required to be dialed for various international calls is not a constant, and may not be known by a table in memory, so that a time-out of five seconds is used by computer 30 to conclude that the last of all the necessary digits have been entered by the customer.

At the end of a full sequence of an international number, or after a time-out following a shorter number, computer 30 treats both kinds of calls as "01" operator calls in the same manner as a domestic call preceded by either a "1" or "0." A "bong" tone follows within three seconds of a maximum-length number, or immediately following a time-out, and a credit number is required to be entered. Collect calls will not be permitted by the program of computer 30 to an international number, nor will third-party billing of any call be permitted to an international number.

An international call properly billed to a verified credit number of a domestic third-party will be dialed by computer 30 as an "011" direct-dialed long distance call, over a prearranged network carrier and routing path. cl "#" REPETITIVE CALLING At the end of a customer call that was charged either to a validated credit account number or a third-party telephone number, additional calls can be placed by the customer in the same manner as has been implemented on other public telephones by AT&T and the BOCs. Before hanging up the handset at the end of a completed or no-answer call, the customer may press the "#" key momentarily, which key is located at the lower right on the telephone keypad. Computer 30 will respond with the message: "You may dial another number, NOW (Beep) . . ." It is necessary that the handset not have been hung up on the cradle to accomplish repetitive calling, however, to prevent an unauthorized caller from charging a call to the previous customer. It will not be necessary for computer 30 to repeat a validation call when the "#" repetitive key is invoked.

COMMUNICATING CALL DETAIL RECORDS

Computer 30 retains the following information in its memory concerning every call, whether completed or not: (1) the time of day the call was initiated, and the language option selected, if any, and the type of call selected; (2) the complete destination number; (3) the billing method selected, and the card, credit, or third-party number to which the call was billed, including the expiration date if entered, and a record of how many times the CDR ("Call Detail Record") of this specific call has been transmitted; (4) the number of attempts made to enter a correct billing number, and the total time required to arrange the billing details; (5) the ringing time before a connection was made to the destination, the length of time required to obtain acceptance of the collect billing arrangement, and the billable time length of each completed call; (6) whether a separate call was completed to a third party for billing validation, and the connection time of such call; (7) the one or more carriers selected for routing and handling of the call, and (8) an optional field to record site-specific information such as a caller ID code or room number.

Once a week in high-traffic installations, or less often if appropriate with respect to the realized traffic level, database communications computer 80 places a data communications call during off-hours to computer 30. After computer 30 answers, and after security protcols and passwords are exchanged correctly, remote computer 80, acting as a data collection host, requests the CDR files be transmitted over the data communications link. After receiving the files without error, a code is returned to mark each file remaining in computer 30 memory that the CDR has already been transmitted once. If for any reason a later retransmission is requested, the mark contained in each CDR of each call is incremented to show that a second transmission was made.

In separate sections of computer 30 memory, statistical and accumulative totals are also created as calls are recorded. These totals provide additional verification that all of the CDR and communications reporting is operating properly without malfunction. An additional record is made of the time, identification, and duration of each transmission made from computer 30 to a remote communications computer. A complete audit trail is provided to detect quickly and correct either accidental errors or fraudulent events that may occur and be undetected the first time.

A limited amount of memory is available in computer 30 to be allocated to store CDR files between the time a call is actually placed and the time that later transmission of the CDR information occurs. It is expected that data collection will always occur sufficiently often that CDR data will never exceed half the memory available. However, in the event that computer 30 detects that half the memory thus allocated to CDR file has been utilized since the last data collection transmission was made, computer 30 will initiate a call to database communications computer 80 and request that CDR servicing be effected immediately. If computer 80 is unable to process the data transfer, but can answer the call and identify the calling computer 30, then computer 80 will terminate the call and post the request for servicing the automation computer as soon as possible.

IMMEDIATE COLLECTION ARRANGEMENTS

In the event that several computers 30 are installed at one site such as a hotel or hospital, or if a multi-line version of computer 30 is implemented as an alternative embodiment, the site personnel may elect the option to collect calls prefixed as a "1+" call directly from the customer during or at the end of his visit to the site. This type of service has for many years been known as "HOBIC" service, in which the billing information for each individual call usually is obtained by labor-intensive voice communications between site personnel and a live telephone operator. Once the billing information is obtained by site operational personel, the charges are collected by placing them on the customer room bill.

When this option has been selected at time of installation of automation computer 30 and information computer 100 (FIG. 3), a different arrangement is carried out for customer calls initially prefixed by a "1+" code. Instead of converting such prefixed calls into "0+" calls as has been described elsewhere herein, computer 30 follows the completed dialing sequence with the voice request: "Please dial your room number, NOW (Beep) . . . " More secure codes can be prearranged in the computer 30 program to be request from the customer, as site requirements require, such as requesting the caller dial his home telephone number. When only security is required, and not actual billing, a home telephone number can be used, even without the 4-digit Personal Identification Number added to form a complete AT&T calling-card credit-account number.

To validate the call prior to speed-dialing the destination number out onto the switched network 60, computer 30 first makes an inquiry over the local communications port, over wire-line 90, to the on-site information computer 100, to check simply that the room is occupied, or otherwise to verify the home telephone number supplied by the customer when he checked into the hotel. After the call is placed as a direct-distance-dialed call at minimum line cost, the billing information is communicated immediately from automation computer 30 to information computer 100. Computer 100 then computes the actual billing rate and charges for the call, or the charge can be determined manually by site personnel handling the other billing and collection matters of the site.

When a local or immediate collection arrangement is made and "1+" calls are placed without converting them automatically to some kind of "0+" collect or charge calls, the Call Detail Record will show that the call was accounted for at the site, and that the call should NOT also be submitted for collection as a charge call.

DIAGNOSTICS AND PROGRAM UPDATES

The operating program installed in the memory of computer 30 has various diagnostic routines to test and check for the normal operation of the system. The diagnostic programs are run and checked extensively at time of installation. Afterwards, certain routines are executed periodically under the control of the system real-time monitor. Any exceptional conditions that do not appear to prevent the proper operation of the system are noted in a table. Each time the CDR files are transferred, the diagnostic exceptions collected during normal operation are also transferred to determine whether a service action is required.

A major feature of the system structure is that an entirely new program can be transferred to computer 30 over the existing data communications facilities, either from remote database communications computer 80, or from on-site information computer 100. To control the data communications, only the residual real-time monitor operating system software that is implemented in special, erasable and re-writable non-volatile memory is used, as is more fully described in another section of this description.

In the event that diagnostic tests indicate that a substantial malfunction in the operating program has occurred, computer 30 can be reprogrammed without an on-site service representative present to provide physical control. In the event that minor program patches or updates are found desirable to be installed in the real-time monitor itself, even these patches can be installed remotely and rewritten into the special non-volatile memory.

There are no mechanical motors or fans that require periodic maintenance in the single-line preferred embodiment of the invention. With the all-electronic construction, a long service-free lifetime can be expected, with the installation of program patches and updates being the principal service action required from the remote communications facility.

FRAUD CONTROL

The first type of fraud that computer 30 has been created to prevent is fraud attempted by a customer using the telephone terminal instrument 10. Since no programming or option selection can be accomplished through telephone 10, no unauthorized alterations or options can be changed in computer 30 by any code entered through the telephone 10. The possible use of "black boxes" to communicate directly with the switching computers controlling the public switched network 60 is also substantially reduced, since all transmission pof signaling information during the setup of a call is originated from computer 30. Direct communication between the telephone 10 and the network 60 is blocked by computer 30 until a ringing sinal is detected by computer 30 at a time with the destination number intended to be dialed has been connected.

At the end of a call, computer 30 is actively, monitoring the network signals to carry out its function to time accurately the ending of the customer call. If unexpected "black box" signals are detected, the call will be terminated to prevent fraudulent conversions of a local call to long disance, or fraudulent termination of the timing of an on-going long distance call.

Fraudulent use of valid credit account numbers is limited by accumulating usage totals of numbers found by computers 30, 80, or 100, is such is in any way involved with on-line validation and accumulating of a database. In the event that any of the computers detects that a prearranged limit has been exceeded for a given credit number, further credit will be denied by the computer as though the number had been rejected by a remote validation routine. Computer 30 will report the excessive use of a credit account to an on-site information computer 100 immediately, and to a remote database communications computer 80 at the end of the day.

The last type of fraud that is effectively controlled by the invention includes so-called "hackers" who attempt to arrange unauthorized data communications over the switched network 60 with either the automation computer 30 or the database communications computer 80. This telecommunications fraud is controlled by requiring passwords for entry into a communication session, where the passwords are changed regularly.

Unloading of Call Detail Records (CDRs) normally required for billing purposes does not cause computer 30 to erase the transmitted files immediately. Even if files were unloaded by an unauthorized "hacker," the same files could be retrieved by computer 80 in an authorized session. The existence of the prior unauthroized breach of normal security would be reported immediately during the second, authorized session.

Critically important communications, such as that causing program updates to be transmitted to computer 30, will be limited to communications sessions initiated by computer 80, terminated during the security checking sequence, then followed immediately by a callback from computer 30 to the prearranged network number of computer 80.

Each communications session is logged as to its occurrence and the events that were conducted, including a description of those files or programs that were involved. Even if such fraud occurred as a result of intelligence information of a company employee, the very next authorized communications would transfer data that reported and described the unauthorized communications, thus aiding in the early detection and elimination of the fraud before substantial effects have been caused.

EXTENDED OPTIONS AND FEATURES

There are several extended options and features that can be selected and installed in the program controlling automation computer 30. One of these features is "Voice Mail Forwarding," whereby any call that is unanswered after five rings of time triggers computer 30 to interrupt the ringing sound and prompt: "Your party does not answer at this time. To store a voice message to be forwarded to your party within the next four hours, dial FOUR, NOW (Beep) . . ." If the party answers during the few seconds of the message, the option is terminated in favor of permitting the destination party to talk. If no answer has still been obtained before the customer presses "4" to signal to computer 30 his acceptance of the voice mail forwarding offer, to call is terminated, and another call is immediately speed-dialed to a special database communications computer 80, that may or may not be the same one that collects CDR files. As the number is ringing, computer 30 prompts with the message, "One moment please, while your call is being processed."

When the special Voice Mail computer answers, computer 30 can be programmed to transmit the destination number and billing information at the start of the call. Then the customer is connected on-line with another voice-message computer that solicits the message to be stored and forwarded later to the destination party.

A second feature that is easily programmed into computer 30 at time of installation provides speed-dialing of local or free telephone numbers for prearranged services. Examples would be one or more taxi companies, one or more airline reservations numbers, hotel delivery services, movie theater ticket information, restaurant reservation numbers, and other services for the customer. Each of these numbers will be published in a separate advertisement left in the hotel room, and also posted on a decal attached directly to the phone. Each number is accessed with only one or two digits being dialed by the customer, according to the listing. The number actually dialed by computer 30 is retained in memory.

A fee would generally be charged for providing speed-dialing of local business numbers that provided services to the hotel customer. However, no charge would be made to the customer for placing the speed-dailed call. Various free services can also be offered, such as weather, time, and public service announcements.

THE AUTOMATION MICROCOMPUTER

Figure 4:
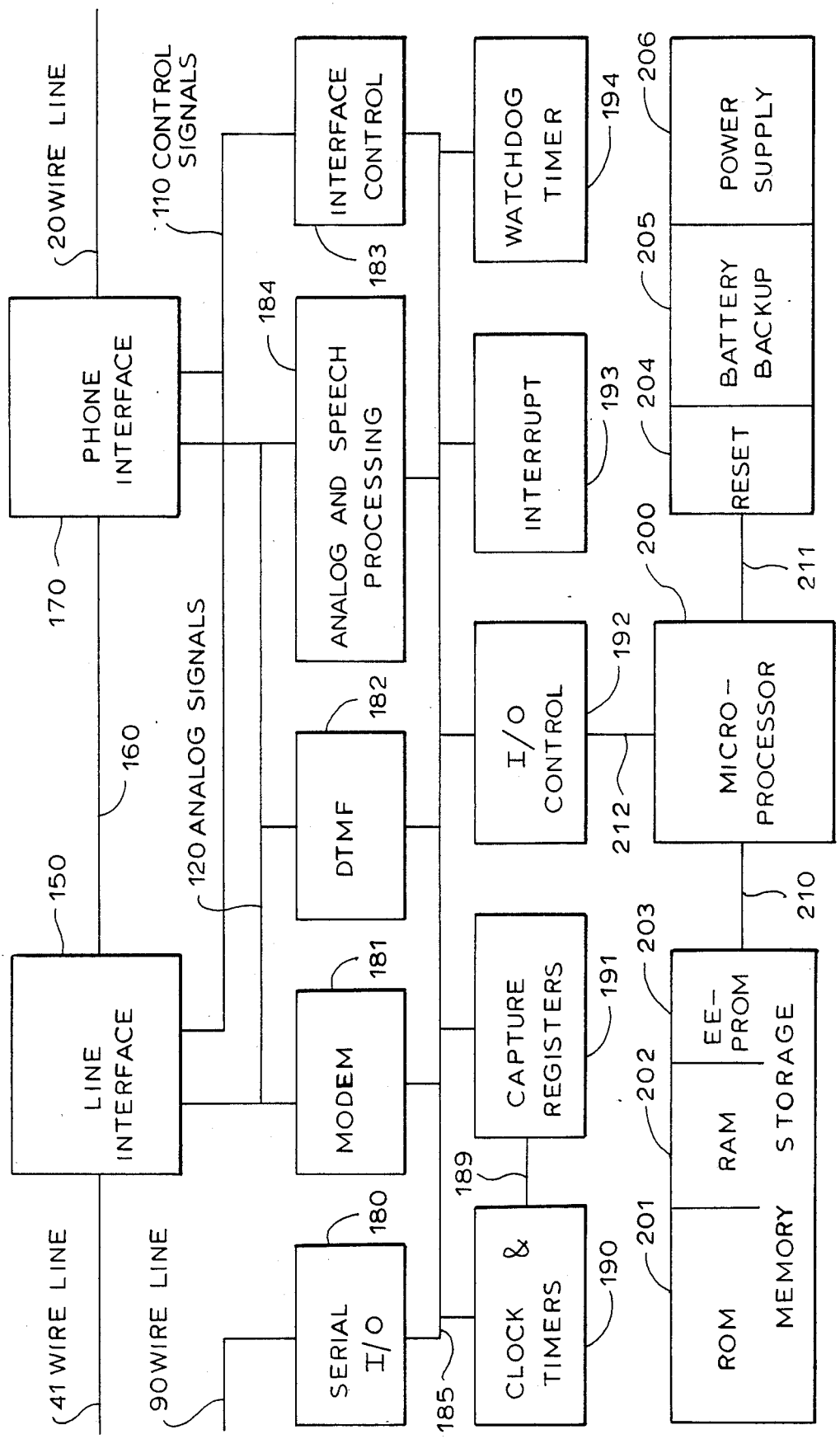
FIG. 4 shows a block diagram of the automation microcomputer and its principal elements.

FIG. 4 shows the preferred embodiment of the automation microcomputer 30 discussed above, and shown connected in FIGS. 1, 2, and 3 between a customer telephone 10 and the public swtiched network 60. Wire line 20 is shown to attach phone interface 170 of computer 30 to telephone 10, while wire line 41 represents either local loop 40, wire line 22, or trunk 51 for attaching line interface 150 to either the public switched network 60, LEX switch 50, or PBX switch 52, respectively. The connection between the line and phone interface is represented by line 160. A set of analog signals appears on a line 120, and control signals appear on a line 110. Lines 110 and 120 connect the interfaces to the other components of the automation microcomputer.

Figure 5:
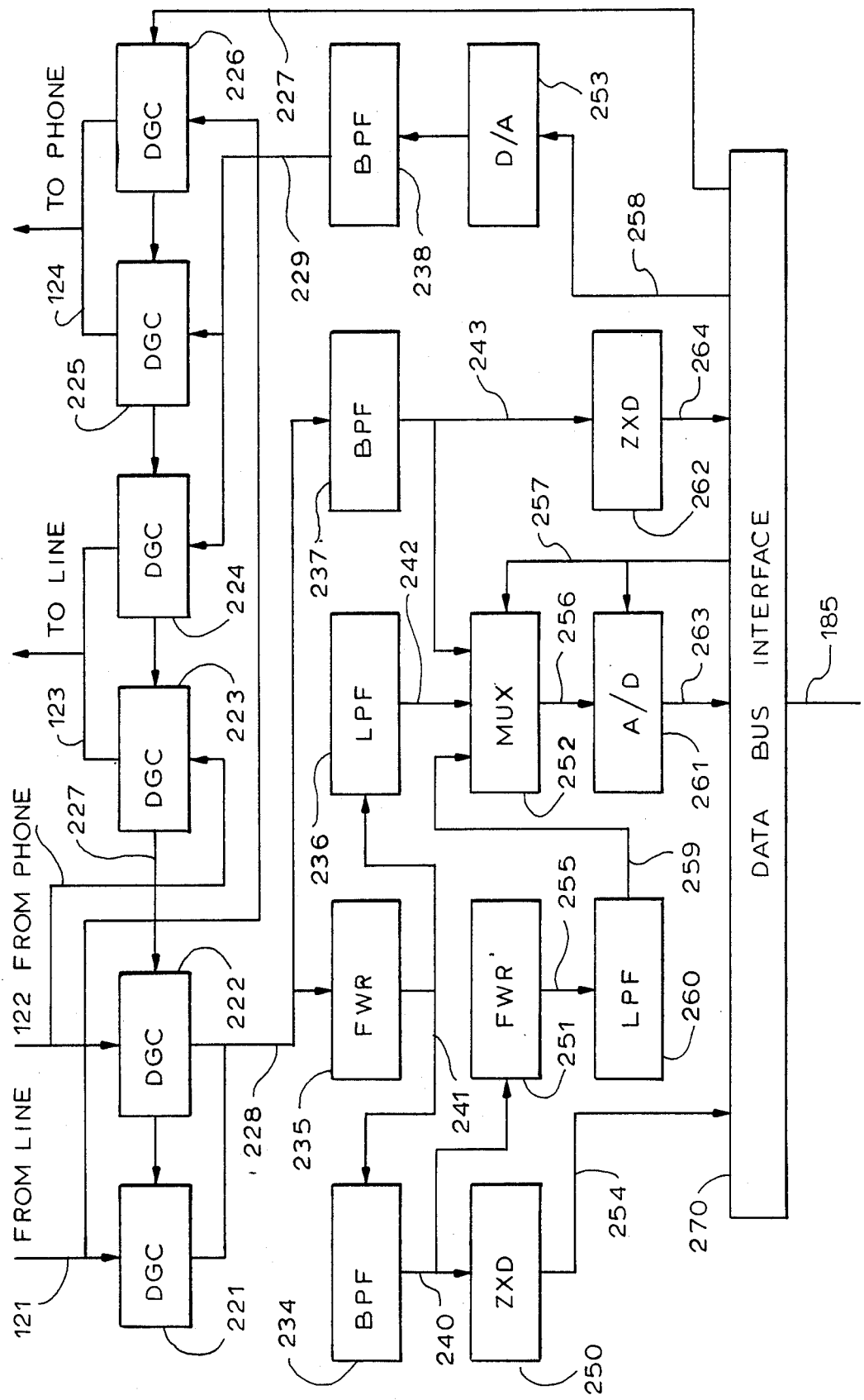
FIG. 5 shows a block diagram of the analog and speech signal-processing elements contained within the automation microcomputer.

Analog signals entering and leaving conventional Modulator-Demodulator (MODEM) 181 and Dual-Tone Multi-Frequency (DTMF) signals entering and leaving DTMF device 182 are shown specifically to be connected to the analog signal line 120, along with the unique analog & speech processing circuitry 184 of the invention shown in more detail in FIG. 5. Conventional serial I/O circuitry 180 connects the automation computer means of local wire line 90 to an on-site information computer 100, shown in FIG. 3. Conventional interface control circuitry 183 provide drivers, receivers, and buffers for control signals 110 transmitted to the line and phone interfaces 150 and 170.

Each of the conventional devices and circuitry, serial I/O 180, modem 181, DTMF 182, interface control 183, and unique invention circuitry for analog and speech processing 184 are connected and operated by bi-directional I/O bus 185, further interfaced on bi-directional address and data bus 212 to conventional microprocessor 200 by conventional I/O control circuitry 192. Additional components provided and connected to the I/O bus 185 include clock and timers 190, capture registers 191 that also receive data directly on line 189 from the timers 190, conventional interrupt detecting and interfacing circuitry 193, and conventional watchdog timer 194 for ensuring that the program execution of microprocessor 200 does not stop or malfunction.

Conventional microprocessor 200 is connected to a set of conventional memory resources by bi-directional address and data bus 210, including Electrically-Erasable and Programmable Read-Only Memory (EEPROM) devices 203, Random-Access read-write Memory (RAM) devices 202, and Read-Only Memory devices 201. The real-time monitor and basic communications program for the automation computer resides in the EEPROM section of memory, which provides a kernel of the operating system that cannot be lost in the event of total loss of power to the memory. However, the EEPROM can be patched and rewritten with new program releases and options provided through either the serial I/O device 180 or the modem device 181, in the event that such corrections and updates are required for proper operation.

The majority of the operative program, the secure communications codes and routines, the site-specific programmable options, the tables for screening destination and billing numbers, the digitized voice and temporarily-stored names of the calling and called parties for collect calls, program updates and patches, and the Call Data Record files are each retained in the conventional high-speed read-write RAM section 202 of memory.

The RAM section is backed up by a rechargeable battery-backup facility 205, which stores enough energy to retain all the data in the clock circuitry 190 for years and the RAM memory for months in the absence of AC mains power supplying power supply 206.

The data describing all of the pr-composed voice messages are stored permanently in the ROM section of memory because such data are not likely to require field patches and fixes to correct malfunctions, and because ROM storage devices usually are less costly than RAM memory devices. Conventional optically-Erasable, Progframmable Read-Only Memory devices (EPROM)

can also be used in place of ROM devices for earyly versions of first releases of the speech message data.

There are several conventional means for causing the reset circuitry 204 to override the current program state and to restart the program at its beginning or at a checkpoint. Including in these reset alternatives are the watchdog timer 194, the condition of the battery backup subsystem, the conditions in the AC mains power supply 206, and various progrm status conditions detectable within the operation of the microprocessor 200. The combination of these reset controls best ensures that the automation microcomputer 30 shown in FIG. 4 never stops when it is possible for it to continue to function, and never loses billing data to an economically significant degree.

The programming facilities and routines of the invention are presented herein only in terms of the customer-visible functions and processes that have already been described, and not by detailed code listings that would be applicable to only one embodiment of a microprocessor and supporting resources. However, approximately 8K bytes of EEPROM storage is required to hold the operating monitor and communications kernel necessary to carry out the unique system design of microcomputer 30. Approximately 32K bytes in addition to the 8K bytes of EEPROM storage will be required to store the remainder of the microprocessor control program.

The Call Detail Record for each call will require about 100 decimal digits and 50 bytes of packed-decimal data. Memory for at least 200 calls and CDR files, including data stored for incomplete calls for auditing and fraud control purposes, will require an allocation in the RAM storage 202 of about 10K bytes. As it will be estimated subsequently, another 18K bytes of RAM storage will be allocated for storage of customer voice names. The total capacity of RAM memory 202 is planned not to be at least 64K bytes.

ANALOG AND SPEECH PROCESSING

The unique analog and speech processing circuitry 184 utilized by automation microcomputer 30 of the invention is shown in more detail in FIG. 5. The analog and speech signals received from the line 41 by the line interface unit 150 of automation computer 30, as shown in FIG. 4, are coupled from the local loop or trunk line by connection 121 (FIG. 5) into a Digital Gain Control (DGC) circuit 221. The analog and speech signals received from the phone line 20 by the phone interface unit 170 of automation computer 30, also shown in FIG. 4, are coupled from the phone line by connection 122 (FIG. 5) into a second Digital Gain Control (DGC) circuit 222. The analog and speech signals that are output the line 41 from the line interface unit 150 are coupled through DGC's 223 and 224 an output line 123. The analog and speech signals that are output to the phone line 20 from phone interface 170 are coupled through DGC's 225 and 226 to another output line 124. The hybrid and directional coupling circuitry for both the line and phone interfaces 150 and 170 of automation computer 30 are shown in more detail in FIG. 6 and will be described subsequently.

The several Digital Gain Controls DGC 223, 224, 225, and 226 have gain and attenuation ranges sufficient to present the conventional and proper maximum signal levels to both the line and phone interfaces 150 and 170. DGC 223 couples all incoming signals from the phone line 122 immediately out to output line 123, depending on the digital gain setting arranged by the DGC control bus 227. Similarly DGC 226 couples all incoming signals from the line 121 immediately out to phone output line 124, also depending on the digital gain setting out to phone output line 124, also depending on the digital gain setting arranged by the DGC control bus 227. The control bus 227 is driven i one direction from the data bus interface 270, and can set the gain of each of the several DGC's independently.

DGC 221 is capable of a large or substantial gain in order to produce adequate incoming signal levels from the weak signals on line 121 to feed line 228 and the receiving analog and speech processing circuitry. DGC 222 does not require nearly as large a gain capability since incoming signals on the phone line 122 usually are substantially larger signals than those received from the line 121. When the analog and speech processing circuitry 184 is acting on incoming signals 228, whether from the line 121 or the phone line 122, the unknown signal is fed into Full Wave Rectifier (FWR) 235 and through line 241 into Low Pass Filter (LPF) 236 to create a signal at 242 representing the average amplitude of the unkown input at 228.

At the same time, the output of FWR 235 is connected by line 241 through Band Pass Filter 234, whose output is connected by line 240 through another FWR 251, then connected by a line 255 through another LPF 260 to create a signal at 259 representing the average amplitude of the variations of the amplitude of the unknown input at 228. The two average amplitudes are selectively connected through a Multiplexer (MUX) 252, lone at a time, and transmitted over a line 256 to be converted to computer-readable digital data by an Analog-to-Digital converter (A/D) 261. The A/D and MUX are digitally controlled by signals delivered on line 257 from the data bus interface 270, and the D/A output data is connected into data bus interface 270 by a line 263.

At the same time, the output signal of BPF 234 is connected to Zero-crossing Detector (ZXD) 250, a circuit with very high gain that creates a pulse at each polarity transition. The pulse events from ZXD 250 are connected by a line 254 directly into data bus interface 270 to have the time intervals between pulses measured and quantized by one of the timers 190 under program control of microprocessor 200. This period measurement, and its reciprocal, instantaneous frequency, is utilized by the microprocessor program along with average amplitude signals on line, 259 and 242, in determining the character of and in distinguishing various signals received from line 121, including ringing, busy, intercept, pulse, DTMF, and voice signals.

Also at the same time, the instantaneous content of the total signal existing at each instant in incoming line 228 is measured. This is done by first passing the composite signal through BPF 237, whose bandwidth limits the signals to be measured to the normal voice-frequency band from 300 to 3,000 Hertz. Then the out line 243 of BPF 237 is connected to another Zero Crossing Detector (ZXD) 262, while the pulse events from ZXD 262 are connected by line 264 directly into data bus interface 270. As with the output of ZXD 250, but at a much higher rate of pulse events, the time intervals between pulses occurring at 264 are measured by one of the timers 190 under program control of microprocessor 200. This period measurement, and its reciprocal, instantaneous frequency, is also utilized by the microprocessor program in distinguishing the various signals received from line 121.

The output 243 of BPF 237 is also connected directly to another input of MUX 252 to be sampled and converted to digital data by A/D 261, at the moment when a name being spoken by a customer is to be recorded and stored temporarily in the RAM memory storage 202 before being recalled and forwarded under control of microprocessor 200 to a destination party for acceptance of collect and third-party billing. The voice reconstruction is accomplished by data connected by a line 258 into Digital-to-Analog converter (D/A) 253, whose output is band-pass filtered by BPF 238 and connected by 229 into both DGC 224 and 225 for amplitude attenuation and direction control.

In order to limit the amount of memory required in RAM storage 202 to hold two customer-name utterances at the same time, the quantized data obtained from A/D 261 is reduced in microprocessor 200 by a conventional algorithm known as Differential Pulse-Code Modulation (DPCM). Any instantaneous periods of silence amid parts of a name are also removed and coded to conserve storage requirements in RAM 202. The average data rate required to store high-quality processed voice utterances such as customer-spoken names is reduced to less than 24,000 bits per second and 3,000 bytes per second. Up to three seconds are permitted in the operating program for the customer to speak each of two names, thus requiring 18K bytes of storage allocation in RAM 202.

The same algorithm used to reconstruct the customer names and to create data to drive D/A 253 is also used to generate the many voice message and interactive prompts from data stored in ROM memory 201. A total of about 70 seconds of voice messages are required for the set of messages described herein, including that needed for storing two different languages, which at an average rate of 3K bytes per second of speech requires an allocation of 200K bytes of ROM memory storage 201. Requirements for additional tables of stored telephone numbers and data will increase the total ROM memory to 256K bytes.

LINE AND PHONE INTERFACES

One unique feature of the invention is that it uses two permanently separated analog and speech processing interfaces, each coupled to communicate in only one of the two different directions of the line into which automation computer 30 has been connected. Further, the two directions should not have any analog or speech signals coupled to each other unless under the intentional control of microprocessor 200. The interfaces are transient-protected and dielectrically isolated from earth ground and the signal ground of computer 30 circuitry.

Even further, the "talk battery" voltage and loop current supplied from either the switched network 60, the LEX switch 50, or a PBX switch 52 is not interrupted or replaced, but instead passes through the line and phone interfaces 150 and 170 with minimal loss and attenuation, so that the public telephone instrument 10 has the full magnitude of voltage and current previously available for its operation. Further, in arranging for store and forward signal operation, the talk battery voltage preferrably is maintained from the network while speech-interactive communications are being carried on between automation microcomputer 30 and the customer at telephone 10. The interface is not sensitive to or affected by changes in the polarity of the tip and ring connection provided to the line side 41 of computer 30.

Figure 6:
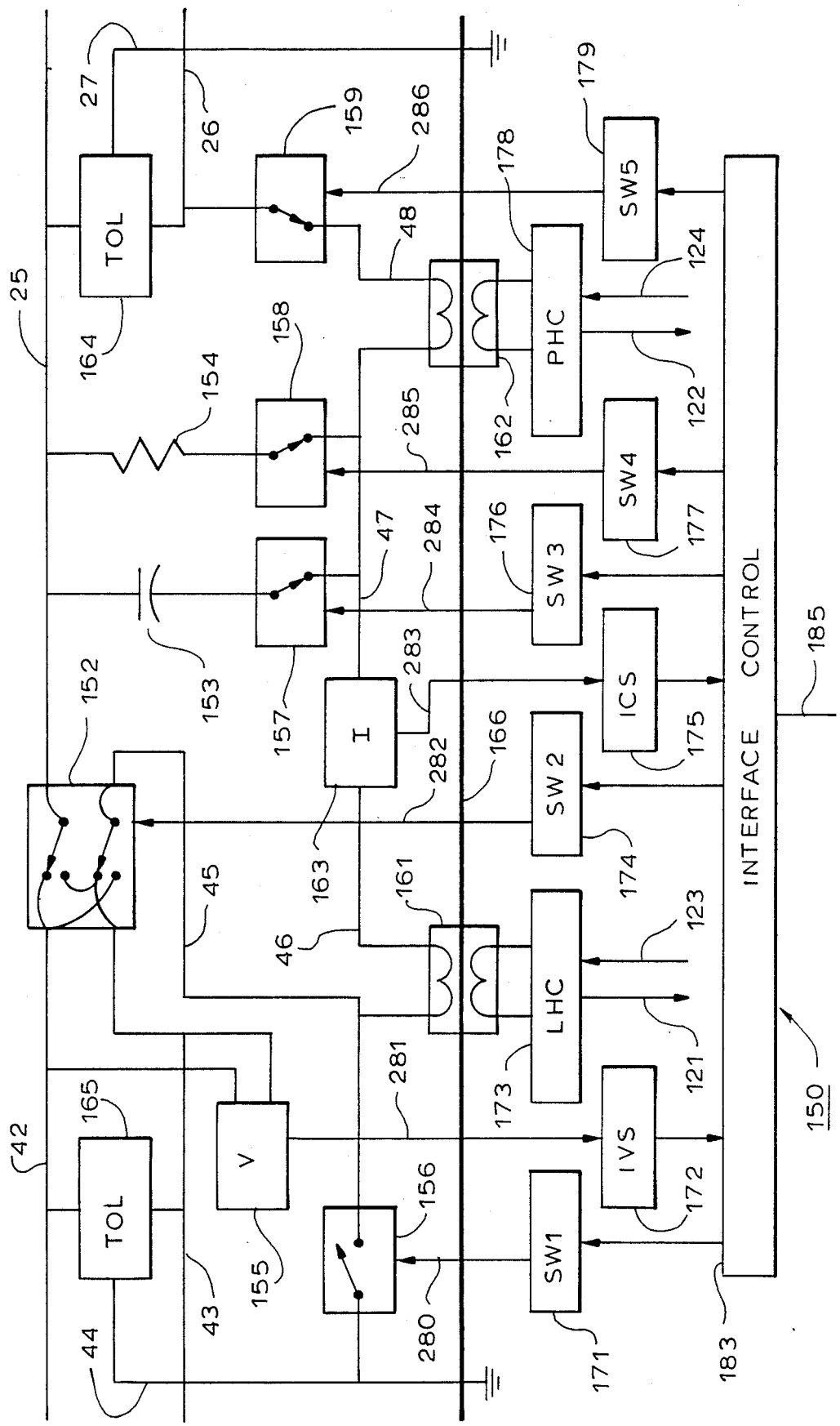
FIG. 6 shows a block diagram of the coupling, sensing, and isolating elements whereby the automation microcomputer is interfaced to conventional telephones and lines.

These and other objectives are accomplished as shown in FIG. 6, wherein the full details are shown of the unique line interface 150, the unique phone interface 170, the analog signal line 120 shown as unidirectional lines 121, 122, 123, and 124, and the control signal line 110 connecting to conventional interface control circuitry 183 of the invention. The two separate wire lines previously labeled signly as 41 leading from line interface 150 to the line side are now showbn as lines 42 and 43, with a third line 44 to earth ground. A conventional Transient Overvoltage Limiter (TOL) 165 prevents the instantaneous voltage on either line 42 or 43 from exceeding about 200 volts either side of ground line 44, permitting ring signals to be received without current loss to ground in the TOL circuitry.

Similarly, the two separate wire lines previously labeled singly as 20 leading from phone interface 170 to the telephone instrument 10 are now shwn as lines 25 and 26, with a third earth ground line shown as 27. A second TOL 164 prevents the instantaneous voltage on either line 25 and 26 from exceeding the same 200 volts either side of ground 27, similar to the TOL 165 on the line side. This permits the telephone instrument wires 20, 25, and 26 to be routed outdoors between buildings where exposure to lightning and transients can occur similarly to that encountered on the line side.

Earth grounds 27 and 44 are inter-connected by a shielded ground line 166, separate from and isolated from the computer 30 circuit physical ground. All line interface circuitry shown above the line 166 is dielectrically isolate from the computer interface circuitry shown below the line 166, with very low stray capacitances between sides, such that transient surges of any sort in TOL 165 and 164 do not cause surge voltages or currents to flow in the computer interface circuitry. Conventional electromagnetic relays 15, 156, 157, 158, and 159 provide isolation of the drive signals that switch the functions to be described for the line and phone interfaces. Conventional electromagnetic transformers 161 and 162 provide extremely-high isolation of the analog and speech signals from the active amplifiers and drivers 173 and 178 of the computer side of ground 166, in addition to full differential-coupling of the low-level line and phone audio signals with extremely high Common-Mode Rejection Ratios (CMRR).

Voltage-measuring circuitry (V) 155 conducts signals to Isolated Volatage Sense (IVS) circuitry 172 by extremely large-value resistors that permit only microamp-level, controlled DC signals across the ground barrier 166. Current-measuring circuitry (I) 163 connects signals to Isolated Current Sense (ICS) circuitry 175 through optical-electronic (Opto) couplers (not shown) that conduct no measurable signals of any sort across the ground barrier 166.

Operation of the line and phone interfaces 150 and 170 shown in FIG. 6 is accomplished entirely by the program control commands and data of microprocessor 200, acting through bi-directional I/O bus 185 and interface control circuitry 183. The operation of the interface starts with the telephone instrument 10 connected to lines 25 and 26, but not conducting any current in the on-hook state. Switches 156, 157, and 158 are open, driven by circuits SW1 171, SW3 176, and SW4 177, respectively, while 159 is closed and driven by SW5 179. Double-Pole Double-Throw (DPDT) switch 152 is driven by SW2 174 to the state where a positive voltage appears on line 25 with respect to line 26, prior to the moment that switch 157 might be closed to connect polarized energy storage capacitor 153 across the line. Full line voltage of 48 volts is measured by IVS 172, and zero loop current is sensed by ICS 175.

Coupling and isolation transformers 161 and 162 each are terminated in their 300-ohm characteristic impedances with an active Hybrid Circuit, LHC 173 for the Line side, and PHC 178 for the Phone side of the interface. The Hybrid Circuits 173 and 178 split the bi-directional signal existing at each side of the line into unidirectional signals 121 and 123 for the line side, and 122 and 124 for the phone side. The impedance match of the two Hybrid Circuits is designed for maximum signal separation with switch 157 closed, connecting capacitor 153 across the line with a very low impedance that short-circuits all audio-frequency signals while passing the DC voltage and current from line to phone.

The first event of a customer call occurs when telephone 10 is taken off-hook by a customer, causing current to flow from line 25 to 26 and measured by ICS 175 to be between 20 and 100 milliamps, and causing the voltage sensed at IVS 172 to drop to from 5 to 15 volts. Immediately upon detecting the off-hook condition, switch 157 is closed to connect capacitor 153 and to separate the signal conditions of the two lines. Switches 156 and 158 are left open, and switch 159 is left closed. Within one second the voltage across capacitor 153 and the line current sensed by ICS 175 stabilize, and a dial tone is received from the network at 121. A program-generated dial tone is created by driving D/A 253 (FIG. 5) with a repetitive data pattern, then connected to the phone by 124 for the customer to hear. When the first DTMF signal is created by the customer dialing his first digit of the destination number, the DTMF signal is connected through 122 and detected in the DTMF receiver circuitry of 182. The dial tone routine driving D/A 253 is immediately terminated and no more signals are connected to line 124 while DTMF dial tones are being received. "Bong" tones and voice messages for the interactive prompting of the customer are also created with the same D/A 253, for transmission to the customer out line 124, to the destination party out line 123, or both simultaneously.

The network or switch providing the loop current and voltage from the line side 41, 42, and 43 of the interface will be stable for only about 8 to 10 seconds in the absence of any dialing tones outbound through line 123. In the event that the interaction of customer dialing and computer generated voice messages takes more than 8 seconds, as is common, a single dialing digit must be selected by the microprocessor program and transmitted onto the network/switch line by the generator circuit of DTMF 182, through 123. Each digit that is transmitted will cause the loop current and voltage to remain stable for another 8 seconds, as long as the sequence of dial digits is interpreted by the network controllers as a valid, although somewhat slowly-delivered, dialing sequence. By overlapping the receiving of DTMF digits from the customer with the generating of DTMF digits by the computer, the network line current can be sustained for at least a full minute while all necessary communications with the customer are carried out.

If at any point in the series of events making up the interactive communications with the customer or a destination party, it becomes necessary to initiate a new call, switches 157 and 159 must be opened together to completely interrupt the loop current and signal to the network that the computer has gone on-hook momentarily. Then when switches 157 and 159 are again closed, loop current will again flow through the off-hook customer telephone to reestablish a network off-hook condition. Switch 159 could also be located on the line side of capacitor 153, then switch 157 would not have to be opened with switch 159 for this operation.

After all call billing arrangements have been established, the call connection is made by permitting the signal from 122 to be connected by DGC 223 to 123 (FIG. 5), and similarly permitting the signal from 121 to be connected by DGC 226 to 124 (FIG. 5). In this mode, neither the A/D 261 or the D/A 253 are used for the customer voice signals to be connected. The line separation capacitor 153 is left in the circuit at all times during the customer's conversation. The amplitude of weak signals, particularly those arriving from the line 121, can be adjusted by increasing the gain of DGC 226. The practical limit of gain adjustment occurs when sidetones feed through the imperfectly-matched Hybrid Circuits, and the loop gain through LHC 173 and PHC 178 approaches unity.

If answer supervision is available from the LEX switch 50, or from the central office switch of network 60, by means of a "reverse battery" signal at the moment when the destination party answers, the reversed current is detected by ICS 175. Before the voltage on capacitor 153 can changed appreciably, switch 152 is transferred to maintain the same polarity on the capacitor and the customer phone as existed before the supervisory signal was applied. Similarly at the end of the call, when the battery condition is returned to its starting polarity to signal that the destination party has hung-up first to terminate the call, the reversal of the current is again detected by ICS 157, and switch 152 is transferred back.

If an installation is made with the incorrect polarity for capacitor 153, the condition will be detected by IVS 172, and switch 152 will be transferred to establish the correct starting polarity. If during the operation of the installation a wiring change is inadvertently made, and the polarity again becomes incorrect, the same correction will be made automatically by a transfer of the normal state of switch 152. Switch 152 would be implemented, in a preferred embodiment, with a magnetically-latching relay that is stable in either state while de-energized.

Switch 156, driven by SW1 171, is arranged to provide ground start current for calls initiated by computer 30, when such is required by the LEX switch or network. Resistor 154 and switch 158, driven by SW4 177, are used both to provide loop current for a loop start installation, and to provide pulse signaling to the network if required for installation to an older telephone exchange. Voltage sense circuits V 155 and IVS 172 pass both the DC value and also the low-frequency ringing signal for the microprocessor to detect and use in answering calls from remote data communications computers. Similarly, ringing can be either passed to energize the customer telephone instrument or blocked by a program option that opens switch 159 in response to the ringing signal.

SHARED LINES AND PHONES

Figure 7:
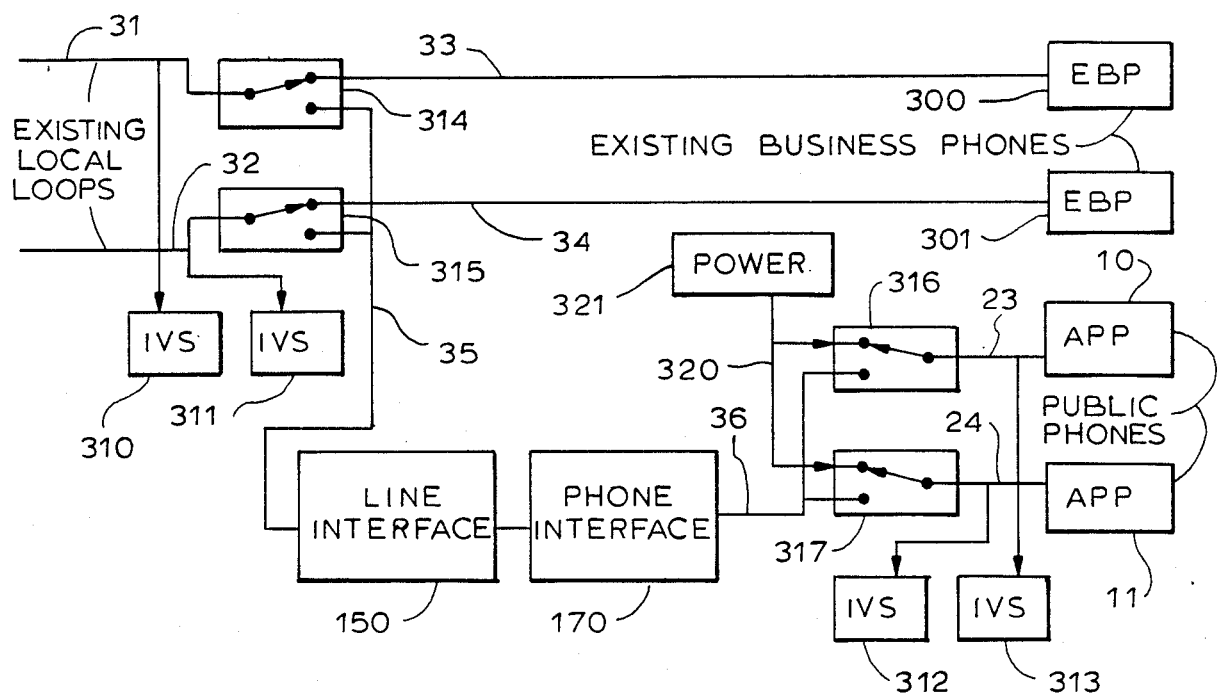
FIG. 7 shows a block diagram of the line-coupling and switching elements of a shared-line, multi-line, multi-telephone automation microcomputer.

FIG. 7 of the drawings shows a special option of the invention that provides Automated Public Phones (APP) connected with shared business lines and phones. This feature of the invention applies particularly to installations where there may not be a sufficient usage pattern or call traffic to pay for dedicated lines assigned to the microcomputer for implementing an automated public phone service. Instead, FIG. 7 shows that a single automation computer with a single line and phone interface 150 and 170, arranged substantially the same as shown previously in FIGS. 4, 5, and 6, can be further switched for installation on one or two existing business lines 31 and 32.

The configuration of FIG. 7 shows how one or two APP instruments can be connected to one or two existing business phone lines 31 and 32, and still maintain full use of the Existing Business Phones (EBP) 300 and 301. The phones 300 and 301 are assumed to be in use prior to the installation of the automation computer. The instruments for Automated Public Phones (APP) 10 and 11 are assumed to be newly-installed for service where no such public phone was available before, such as in restaurants and "Bed & Breakfast" inns. Particularly, radio-operated cordless phones can be connected as the instruments for APP 10 and 11, permitting telephone service at the dining tables and the sleeping rooms of these small businesses.

The additional equipment that is required to implement this option to the invention consists primarily of additional switching devices 314 and 315 connected on the line side, and switching devices 316 and 317 connected on the phone side. In addition, Isolated Voltage Sense (IVS) circuits 310 and 311 are provided to detect the usage state of existing local loop lines 31 and 32, while IVS circuits 312 and 313 detect the usage state of the newly installed APP instruments 10 and 11. In each case, conventional signal connections (not shown) drive the switches from, and provide the IVS outputs to, the microprocessor.

The last facility that is needed to complete this embodiment of the invention is an auxiliary power supply 321 connected by line 320 through switches 316 and 317 to provide initial loop current and operating voltages for the APP instruments, when the instruments are not switched to an available existing local loop. The auxiliary power is necessary to make it possible for the IVS voltage sensors 312 and 313 to detect the off-hook status of the APP instruments.

In operation, when a customer takes an APP off-hook, the automation computer must first scan the existing local loops to which it is connected to find one not already in use. If none is available, a simple busy tone is generated and fed to the APP handset. If one of the lines is not in use, the appropriate switch connects the automation computer to that unused line and removes the line, temporarily, from availability to the existing business phone. When the customer call is completed, the lines are restored to the business phones for both incoming and outgoing calls.

What is claimed is:

1. An electronic computing system for use in the automatic control of telephone instruments and networks over which users can communicate by means of either spoken voice or manual commands, and comprising:

means for electronic storage of data, for automatic execution of a computer program, and for input-/output transfer of various electronic signals, said means comprising an automation computer, means for connection of said automation computer to both a conventional telephone instrument and a switched network, means for generation and detection of conventional currents, pulses, and tones associated with the manual operation and dialing of said telephone instruments, means for storage and selective regeneration of spoken voice utterances, means for analysis and detection of selected voice utterances, including means for distinguishing selected voices utterances from other signals and voice utterances, means for measuring the amplitudes and timings of the events and waveform characteristics of detected tones, pulse, and voice signals, means for communicating with the calling party and the calling telephone instrument such that the destination party cannot participate in such communication, means for communicating with the destination party and the destination telephone instrument such that the calling party cannot participate in such communication, means for communicating with various conventional automatic equipment, and with parties other than the calling and destination parties, including means for the detection of current, pulse, tone, and voice signals returned in a responsive manner to said automation computer, means to permit validly-charged calls to proceed and means to establish a conventional voice connection between the calling and destination parties, and means to prevent communication between the calling and destination parties and to terminate calls attempted to be charged to an invalid credit account, including means for originating telephonic calls to an alternative number stored in or created by said computer and other than those numbers supplied by the calling party, means for transmitting credit account numbers to automatic equipment and to parties responding at any such called alternative number, means for detection of tone and voice signals returned in a responsive manner to indicate the credit status and account number validity of said transmitted credit account numbers, means to terminate said telephonic call made to an alternative number and to resume other processes to be carried out by said automation computer.

2. Means in accordance with claim 1 wherein said system includes means for voice and tone communications with the calling party who has originated said call, means for detection of tone signals returned in a responsive manner from the calling party to indicate the type of telephonic call being originated and the method of call charging and billing being selected, means for suspending further voice communications with the calling party while other processes are carried out by said automation computer.

3. Means in accordance with claim 1 wherein said system includes means for originating a conventional telephonic call to the number of a called destination party supplied by the calling party, means for voice communications with the called party who responds to said call, including an announcement that charges for said call were being reversed for collection from said called party, means for regeneration of the stored voice name of the calling party as identification of the person who is trying to place a station-to-station call to be charged to the number of said called party, means for detection of pulse and tone signals returned in a responsive manner from the called party to indicate the acceptance or rejection of collect charges for said connection to said calling party.

4. Means in accordance with claim 1 wherein said system includes means for originating a conventional telephonic call to the number of a called destination party supplied by the calling party, means for voice communications with the called party who responds to said call, including an announcement that charges for said call were being reversed for collection from said called party, means for regeneration of the stored voice name of the calling party as identification of the person who is trying to place a person-to-person call to be charged to the number of said called party, means for regeneration of the stored voice name of the called party as identification of the particular person who is sought to be called, means for detection of pulse and tone signals returned in a responsive manner from the called party to indicate the acceptance or rejection of collect charges for said connection to said calling party.

5. Means in accordance with claim 1 wherein said system includes means for originating a conventional telephonic call to the number of a creditor third party supplied by the calling party, means for voice communications with the creditor third party who responds to said call, including an announcement that charges for another call to a destination party were being assigned for collection from said creditor third party, means for regeneration of the stored voice name of the calling party as identification of the person who is trying to place a credit charge to the number of said creditor third party, means for detection of pulse and tone signals returned in a responsive manner from the third party and indicating the acceptance or rejection of assigned charges for said connection to a destination party.

6. Means in accordance with claim 1 wherein said system includes means for either origination or answering of either a conventional telephonic call or a local direct connection that is placed to enable automatic data communications between said automation computer and another computer means, means for transmitting and receiving data to and from said storage facility of said automation computer, including data describing the history and details of user calls, numbers, and charging arrangements.

7. An electronic computing system for use in the automatic control of telephone instruments and networks over which users can communicate by means of either spoken voice or manual commands, and comprising:

means for electronic storage of data, for automatic execution of a computer program, and for input-/output transfer of various electronic signals, said means comprising an automation computer, means for connection of said automation computer to both a conventional telephone instrument and a switched network, means for generation and detection of conventional currents, pulses, and tones associated with the manual operation and dialing of said telephone instruments, means for storage and selective regeneration of spoken voice utterances, means for analysis and detection of selected voice utterances, including means for distinguishing selected voice utterances from other signals and voice utterances, means for measuring the amplitudes and timings of the events and waveform characteristics of detected tones, pulse, and voice signals, means for communicating with the calling party and the calling telephone instrument such that the destination party cannot participate in such communication, means for communicating with the destination party and the destination telephone instrument such that the calling party cannot participate in such communication, means for communicating with various conventional automatic equipment, and with parties other than the calling and destination parties, including means for the detection of current, pulse, tone, and voice signals returned in a responsive manner to said automation computer, means to permit validly-charged calls to proceed and means to establish a conventional voice connection between the calling and destination parties, and means to prevent communication between the calling and destination parties and to terminate calls attempted to be charged to an invalid credit account, including means for either origination or answering of either a conventional telephonic call or a local direct connection that is placed to enable automatic data communications between said automation computer and another computer means, means for transmitting and receiving data to and from said storage facility of said automation computer, including data describing the programs, status, and operating instructions, means for diagnosing problems and failures in either the hardware or software of said automation computer, including for communicating the results of said diagnosis to said other computer means, means for said automation computer to alter its own information and programs, including memory and storage means that permit automatic writing and rewriting of programs and data, means for correcting and updating said software of said automation computer, including for communicating to said automation computer the results of the processing of said diagnostic data by said other computer means.

8. An electronic computing system for use in the automatic analysis and storage, synthesis and generation, and control and processing of electronic signals and data, including signals associated with currents, pulses, tones, and voices such as are used in telephonic systems, and comprising:

means for electronic storage of data in discrete form, for automatic execution of a digital computer program, and for input/output transfer of various quantized electronic signals, said means comprising an automation computer, means for conversion of continuous electronic signals obtained from sources such as conventional telephone instruments and switching equipment, and from human sources as users and callers communicating over such apparatus, and located external to said automation computer, into discrete, quantized form, means for conversion of events, changes, pulses, amplitudes, frequencies, and other characteristics obtained from said continuous electronic signals derived from said sources external to said automation computer, or obtained from frequency-limited representations of said signals passed through linear filters, into discrete, quantized form, means for communication of said discrete, quantized representations and data obtained from said continuous electronic signals into the discrete electronic storage and other data facilities of said digital automation computer, means for processing and storage of said data by means of stored programs and instructions that can be automatically executed by said automation computer, means for communication of processed and stored data out from the digital storage facilities of said automation microcomputer, into means indicating discrete events, changes, and pulses, means for conversion of said output digital data into continuous electronic signals, and into amplitudes, frequencies, and other characteristics of output signals, including into human speech and voice signals, means for amplification and otherwise increasing the strength of said output signals, means for coupling said output signals onto a bi-directional telephone line, including means for separation of differing signals traveling in opposite directions on said bi-directional line, means for separate control of the current, pulses, tones, and speech signals communicated to each of several coupling means to said bi-directional line wherein said system includes means for data and system security for the storage of data and program of said automation computer, including means for receiving, storing, and changing security key codes, means for requiring the sending and/or reception of security key codes at the beginning of data communications, means for comparing received key codes with stored key codes, including the requirement for a match of key codes being obtained before any data communications can be effected, means for encoding of data being transmitted from the automation computer over the switched network, using a stored key code, and such that decoding by a receiving computer requires knowledge of the stored key code, means for counting and logging the number of unsuccessful attempts at establishing communications and matches of key codes, means for originating data communication calls to auxiliary or host computers, including to report diagnostic or security alarms and information.

9. Means in accordance with claim 8 wherein said system includes means for storing quantized patterns in said storage of said automation computer that describe measured characteristics of selected and particular voice utterances, means for detection and analysis of the characteristics and patterns exhibited by voice utterances coupled from telephone instruments and lines, means for comparing the characteristics and patterns of said signals with said stored patterns of selected and particular utterances, means for distinguishing selected and particular voice utterances from other signals and voice utterances.

10. Means in accordance with claim 8 wherein said system includes means for both input and output conversion to digital form of continuous tone data associated with telephone instruments, including multi-frequency dual-tone signals, means for separation of certain bands of frequencies from other bands by linear filtering, means for distinguishing multi-frequency tone signals generated by manual control of a telephone instrument from voice and other signals.

11. Means in accordance with claim 8 wherein said system includes means for input conversion of line signals arriving from remote apparatus of the switched telephone network, including indeterminate and unspecified signals occurring both prior to and subsequent to the answer of a call by a destination party, means to distinguish said indeterminate signals from voice or other signals resulting from the answer or termination of a call by said destination party, said last-named means including means responsive to the actual start and ending of a communication between calling and called parties.

12. Means in accordance with claim 8 wherein said system includes means for selectively communicating with more than one line leading to more than one conventional telephone instruments, means for selectively communicating with more than one line leading to more than one conventional local loop or trunk line leading to the switched network, means for selectively connecting local loop lines directly to existing or other conventional telephone instruments, including to permit shared conventional use of said lines and instruments not being selectively controlled by said automation computer.

13. Means in accordance with claim 8 wherein said system includes means for measurement of the frequency and period of the instantaneous variations and changes over time in the signals coupled differentially from said telephone instruments and local loop lines, means for measurement of the time average of the absolute value of the amplitude of signals coupled differentially from said telephone instruments and local loop lines, means for measurement of the variations and changes over time of the time average of said amplitude of said signals from lines and instruments, means for measurement of the amplitude of the variations and changes over time of the time average of said amplitude of said signals from lines and instruments, means for measurement of the frequency and period of the instantaneous variations and changes over time of the time average of said amplitude of said signals from lines and instruments, means for computing averages over time of quantized measurements of said amplitudes, frequencies, and periods, means for creating time-changing patterns of quantized measurements of said amplitudes, frequencies, and periods, means for comparing patterns and making decisions upon quantized measurements using stored references that identify and distinguish various states, conditions, and events occurring at said telephone instruments and local loop lines.

14. Means in accordance with claim 8 wherein said system includes means for providing power supply voltages sufficient to retain data and program storage in the memory means of said automation computer, means for providing said power supply voltages utilizing internal energy storage means in the absence of external power supply means, means for modification of data utilized for program instructions executable by said automation computer, including with data obtained through data communications with either a remote or locally connected auxiliary computer, means for allocating and managing a multiplicity of memory devices and means, including conventional technologies that do not lose data in the absence of power, but that can be erased and written by special means.

15. Means in accordance with claim 8 wherein said system includes means for resetting and restarting automatically the control program of said automation computer, means for causing said reset and restart upon the absence of a particular programmed output signal normally present either periodically or within a prescribed time limit, means for causing said reset and restart upon the presence of a particular command sequence received during data communications with either a remote or locally-attached auxiliary computer, means for stopping the execution of the control program of said automation computer upon the loss or absence of normal power supply voltages, means for causing said reset and restart of the control program of said automation computer upon the restoration and presence of normal power supply voltages.

16. An on-site telephone communications system, said system comprising, in combination, at least one telephone instrument at a given site, computer means at said site for enabling the use of said telephone instrument for the making of calls requiring the acceptance of charges for said call by another party at a location remote from said site, without the intervention of a human operator, means for connecting said telephone instrument to said computer means, and means for connecting said telephone instrument into an off-site switched telephone network through said computer means.

17. A system as in claim 16 in which said computer means is adapted to record and store signals identifying the calling party, transmit corresponding signals to said other party using a telephone terminal at said remote location, and for connecting said telephone instrument to enable telephonic communication between said calling party and a called party in response to the receipt of a message from said telephone terminal at said remote location.

18. A system as in claim 17 in which the identifying signals are signals representing the name of said calling party as spoken by said calling party.

19. A system as in claim 16 in which said call is a collect call and said other party is the called party and said message is one conveying acceptance of charges for the call by said called party.

20. A system as in claim 16 in which said call is to be charged to a third telephone number, said other party being the party whose telephone terminal has said third number, and said message is one conveying acceptance of charges for the call by said other party.

21. A system as in claim 16 in which said computer means includes digital data storage means, analog-to-digital signal conversion means for converting analog input signals into digital signals, means for processing and storing said digital signals in said storage means, data retrieval means for retrieving data from said storage means, digital-to-analog conversion means for converting into analog output signals data retrieved from said storage means, means for coupling said analog output signals to a bi-directional telephone line, including means for separating different signals traveling in opposite directions, and means for controlling the signals traveling in one direction separately from those traveling in the opposite direction.

22. A system as in claim 16 in which said computer means includes means for storing digital signals representing measured characteristics of selected voice utterance signals, means for measuring the characteristics of voice utterance signals received from telephone signal conductors, comparing means for comparing the stored characteristics with the characteristics of said received voice utterance signals, and means for indicating those received voice utterance signals which satisfy a predetermined comparison criterion.

23. A system as in claim 16 including a plurality of said telephone instruments at said site, and switching means for selectively connecting said telephone instruments to said computer means.

24. A system as in claim 16 including a plurality of said telephone instruments at said site, a plurality of telephone trunk lines, and switching means for selectively connecting said telephone instruments with said trunk lines through said computer means.

25. A system as in claim 16 including another computer means at a location remote from said site and connected to said switched network and adapted for periodic intermittent connection to the first-named computer means to transfer data from the first-named to said other computer means.

26. A system as in claim 25 including another computer means located on said site and connected to the first-named computer means for supplying credit-card checking information to enable the making of credit-card calls from said instrument.

27. A system as in claim 16 in which said calls comprise collect calls and calls charged to a third party, said computer means also being adapted to facilitate the making of other calls selected from the group consisting of: person-to-person collect calls; credit-card calls; international calls; successive calls charged to a single billing number.

28. A method of manufacturing a telephone system, said method comprising the steps of selecting as a site a location for one or more public telephone instruments where a relatively large percentage of the telephone users seek to make calls charged to a telephone number at an instrument remote from said site, installing at least one computer means at said site, said computer means being adapted to enable the making of said calls without a human operator, and connecting said computer means to said one or more telephone instruments and a remote switched network to enable the making of said calls over said switched network.

29. A method as in claim 28 in which the step of installing said computer means comprises the step of providing pre-programed computer means programmed to record and store signals identifying the calling party, transmit corresponding signals to another party at the location of said remote instrument, and enabling telephonic communication between said calling party and a called party in response to the receipt of a message from said telephone terminal at said remote location.

30. A method as in claim 28 including providing means for periodically connecting said computer means with further computer means for unloading accumulated calling information and performing telephone accounting functions.

31. A method as in claim 30 including the step of installing said further computer means at a facility of an entity administering the operation of said telephone system.

32. Automation computer means for modifying the operation of one or more telephone instruments at a given site to enable the usage of said telephone instrument for the making of calls requiring the acceptance of charges for said call by another party at a location remote from said site, without the intervention of a human operator, said computer means being adapted to make a preliminary connection to said other party at the remote location to solicit and conduct an acceptance signal from said remote location to said computer means, and to connect the calling party to the called party in response to the receipt of said acceptance signal, and said computer means including means for interconnecting said computer means between said one or more telephone instruments on said site and a switched telephone network off of said site.

33. Computer means as in claim 32 in which said call is a collect call and said other party is the called party and said message is one conveying acceptance of charges for the call by said called party.

34. Computer means as in claim 32 in which said call is to be charged to a third telephone number, said other party being the party whose telephone terminal has said third number, and said message is one conveying acceptance of charges for the call by said other party.

35. Computer means as in claim 32 including a plurality of said telephone instruments at said site, and switching means for selectively connecting said telephone instruments to said computer means.

36. A system as in claim 16 including means for enabling communication first between said telephone instrument and said computer while disabling said other party from talking to the calling party, and then enabling communication between said other party and said computer to allow for acceptance of charges for the call, and then allowing communication between said calling party and said other party.

37. A system as in claim 22 in which said predetermined criterion indicates the acceptance or rejection of a telephone credit account number.

38. A system as in claim 16 including means for both input and output conversion to digital form of continuous tone data associated with telephone instruments, including multi-frequency tone signals, means for separation of certain bands of frequencies from other bands by linear filtering, and means for distinguishing multi-frequency tone signals generated by manual control of a telephone instrument from voice and other signals.

39. A system as in claim 16 including means for input conversion of line signals arriving from remote apparatus of the switched telephone network, including indeterminate and unspecified signals occurring both prior to and subsequent to the answer of a call by a destination party, means to distinguish said indeterminate signals from voice or other signals resulting from the answer or termination of a call by said destination party, said last-named means including means responsive to the actual start and ending of a communication between calling and called parties.

* * * * *